(12) United States Patent
Madan et al.

(10) Patent No.: US 12,105,594 B2
(45) Date of Patent: Oct. 1, 2024

(54) CREATING FILE RECIPES FOR COPY OVERWRITE WORKLOADS IN DEDUPLICATION FILE SYSTEMS

(71) Applicant: Dell Products L.P., Round Rock, TX (US)

(72) Inventors: Nitin Madan, Cupertino, CA (US); Bhimsen Bhanjois, Fremont, CA (US); Kalyan C. Gunda, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 183 days.

(21) Appl. No.: 17/841,960

(22) Filed: Jun. 16, 2022

(65) Prior Publication Data

US 2023/0409438 A1    Dec. 21, 2023

(51) Int. Cl.
*G06F 11/14* (2006.01)
*G06F 16/14* (2019.01)

(52) U.S. Cl.
CPC ...... *G06F 11/1453* (2013.01); *G06F 11/1451* (2013.01); *G06F 16/14* (2019.01)

(58) Field of Classification Search
CPC ............ G06F 11/1451; G06F 11/1453; G06F 16/14
See application file for complete search history.

(56) References Cited

U.S. PATENT DOCUMENTS

| 10,078,583 | B1 * | 9/2018 | Wallace | G06F 11/1453 |
| 10,331,362 | B1 * | 6/2019 | Parekh | G06F 16/1748 |
| 2022/0382642 | A1 * | 12/2022 | Bhanjois | G06F 11/1451 |

\* cited by examiner

*Primary Examiner* — Larry T Mackall
(74) *Attorney, Agent, or Firm* — Staniford Tomita LLP (57) ABSTRACT

Embodiments for processing fastcopy overwrite backup workloads (FCOW) as virtual synthetic backups, by detecting whether or not a backup workload comprises an FCOW workload in which a base file is fastcopied to a target file, wherein portions of the base file are overwritten through overwrites by new data in the target file by a deduplication backup process. For FCOW workloads, the process creates a file recipe by trapping seek offsets and write byte lengths for the overwrites, and writing extent information comprising offset differences to a recipe table of the file recipe, and the file recipe facilitates file processing optimizations including differencing, replication, and tiering.

12 Claims, 9 Drawing Sheets

800

DETECT FCOW WORKLOAD
- Determine if File Uses a Fastcopy Extended Attribute
- Copy Base File to Target File and Overwrite
802

CREATE AND STORE RECIPE INFORMATION
- Seek to Right Offset and Write New Data
- Make Recipe from Extents as Written
804

CREATING FILE RECIPES FOR COPY OVERWRITE WORKLOADS IN DEDUPLICATION FILE SYSTEMS

TECHNICAL FIELD

Embodiments relate generally to deduplication storage systems, and more specifically to creating file recipes for fast copy overwrite operations to optimize replication.

BACKGROUND OF THE INVENTION

Data is typically backed up by copying the data from a data source to a data target or storage device or network (destination). Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead such as correcting corrupted data is increased through the backup and restore processes associated with deduplication.

Various different backup operations are supported, such as full, differential, and incremental backups. A synthetic backup is the process of generating a file from a complete copy of a tile created at some past time and one or more incremental copies created at later times. In a virtual computing environment, backups may be referred to as virtual synthetic backups of these various types.

A file recipe is special metadata which is created when a virtual synthetic (VS) backup file is written. A VS file is created using special application program interfaces (APIs), called synthetic APIs, to include portions of prior generations of the backup. The recipe by itself is the relationship of a given file (target file) to a set of prior generations of backup files (called base files), and basically holds information about which portions of the given files are same. The recipe information is provided for replication efficiencies, and this information is now often used for differencing and tiering functions. Since the recipe is created using synthetic APIs, it is employed by products which integrate with DDBoost library (like Dell EMC Avamar and Dell EMC Networker), and other similar systems.

Another kind of virtual synthetic workload, referred to as the fast copy overwrite (FCOW) workload, uses a copy of the last backup image and then the segments which are changed are overwritten in place (on the copy). The FCOW is done on fixed sized segmentation environments where the segmentation would not have the I/O amplification because of the segmentation. However, the FCOW workload does not create recipes since they do not use the synthetic API.

What is needed, therefore, is a method to create file recipes for FCOW workloads so that these workloads get the benefits of the recipe information with respect to differencing, tiering, and other similar features.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
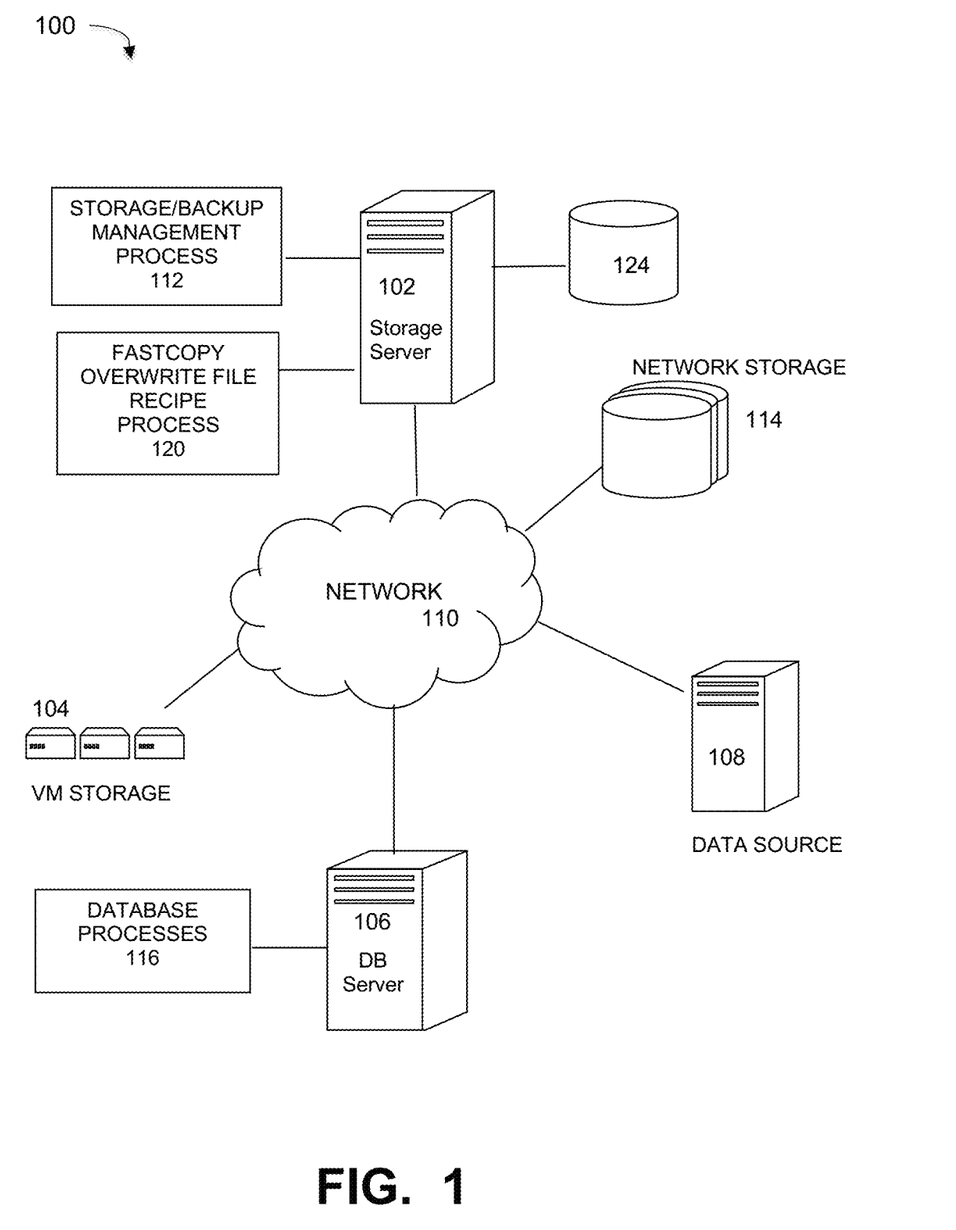
FIG. 1 is a diagram of a computing network implementing a method of creating a file recipe for fast copy overwrite workloads, under some embodiments.

Embodiments are described for a method of creating a file recipe for fast copy overwrite workloads. FIG. 1 illustrates a computer network system that implements one or more embodiments of a data processing and storage network system implementing such a process, under some embodiments.

In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source may be a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The Data Domain File System (DDFS) from DellEMC is an example deduplication filesystem in which the filesystem anchors and segments data as it is ingested. The filesystem keeps track of segments which are stored on the disk, and if the segments are accessed again, the filesystem just stores a reference to the original data segment that was written to disk. A file is therefore a stream of segments, and these segments are uniquely identified by a key/label data element, called a fingerprint. Given a file offset and length, the corresponding data segment fingerprints need to be looked up to access the actual data.

The Data Domain File System (DDFS) is an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
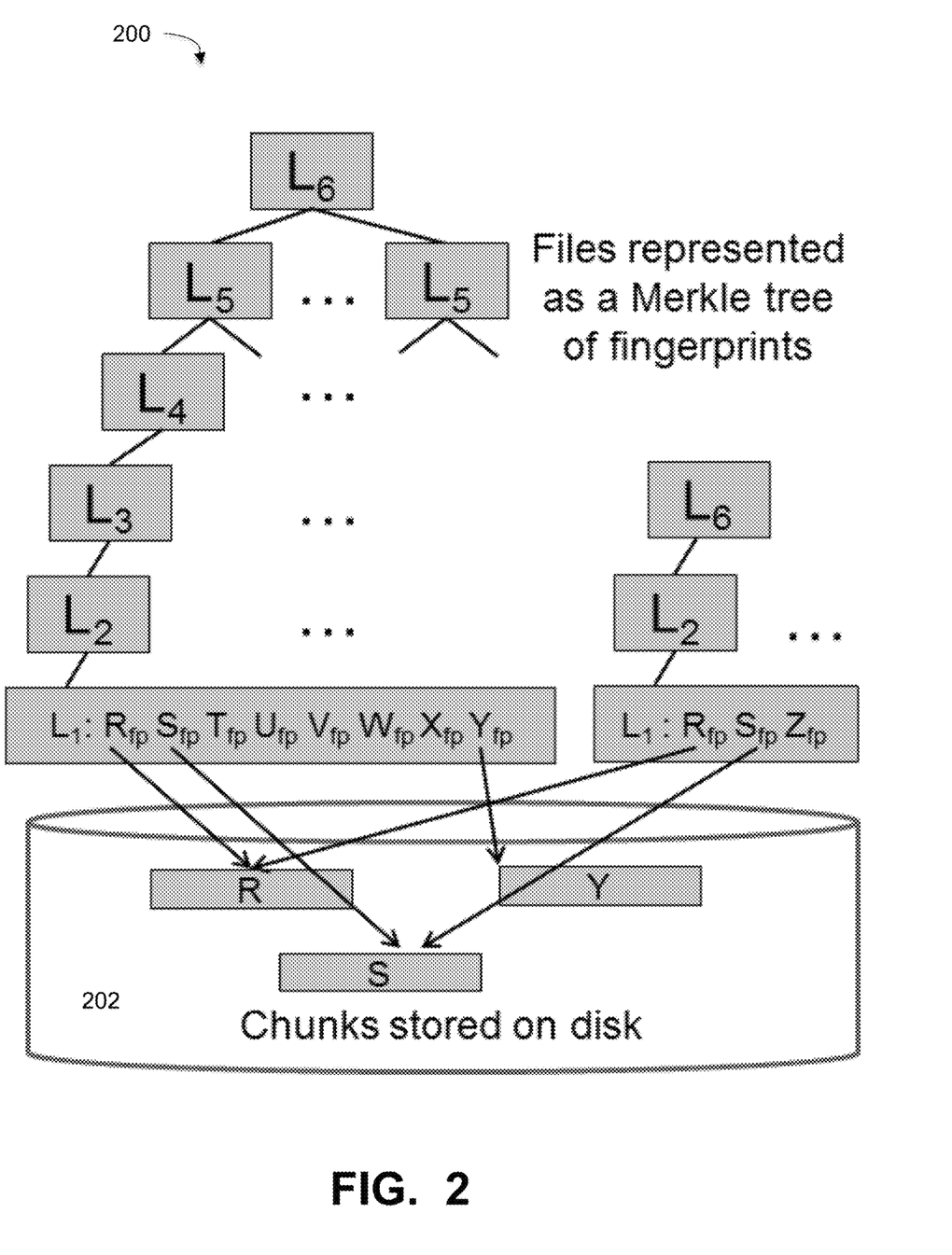
FIG. 2 illustrates files an example Merkle tree representation of files in a deduplication backup system, under some embodiments.

FIG. 2 illustrates files an example Merkle tree representation of files in a deduplication backup system, under some embodiments. As shown in FIG. 2, Merkle tree 200 comprises layers L0 to L6. The chunks directly written to disk 202 are referred to as L0, meaning the lowest level of the tree. Consecutive L0 chunks are referenced with an array of fingerprints by an $L_1$ chunk, which itself is identified by a fingerprint. An array of $L_1$ fingerprints is referenced by an L2 chunk, continuing to the root of the tree; the root is always labeled L6 for convenience, even if the file is small enough not to need intermediate nodes such as the example on the right side of the figure. The L1-L6 chunks are referred to as Lp chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, Lp chunks are themselves stored on disk in containers, which include a relatively small (hundreds of KB) metadata section with a list of fingerprints for the chunks within the container. Thus, they may be read more quickly than the full container.

A Data Domain or similar system can efficiently copy an existing file using the same underlying Merkle tree. It creates the new file with a new name, and therefore a new L6 root of the tree, but that tree then references the identical LP chunks. As this operation involves only the root of the tree, it is trivially fast and does not increase physical space in use beyond the one chunk containing the L6.

Figure 3:
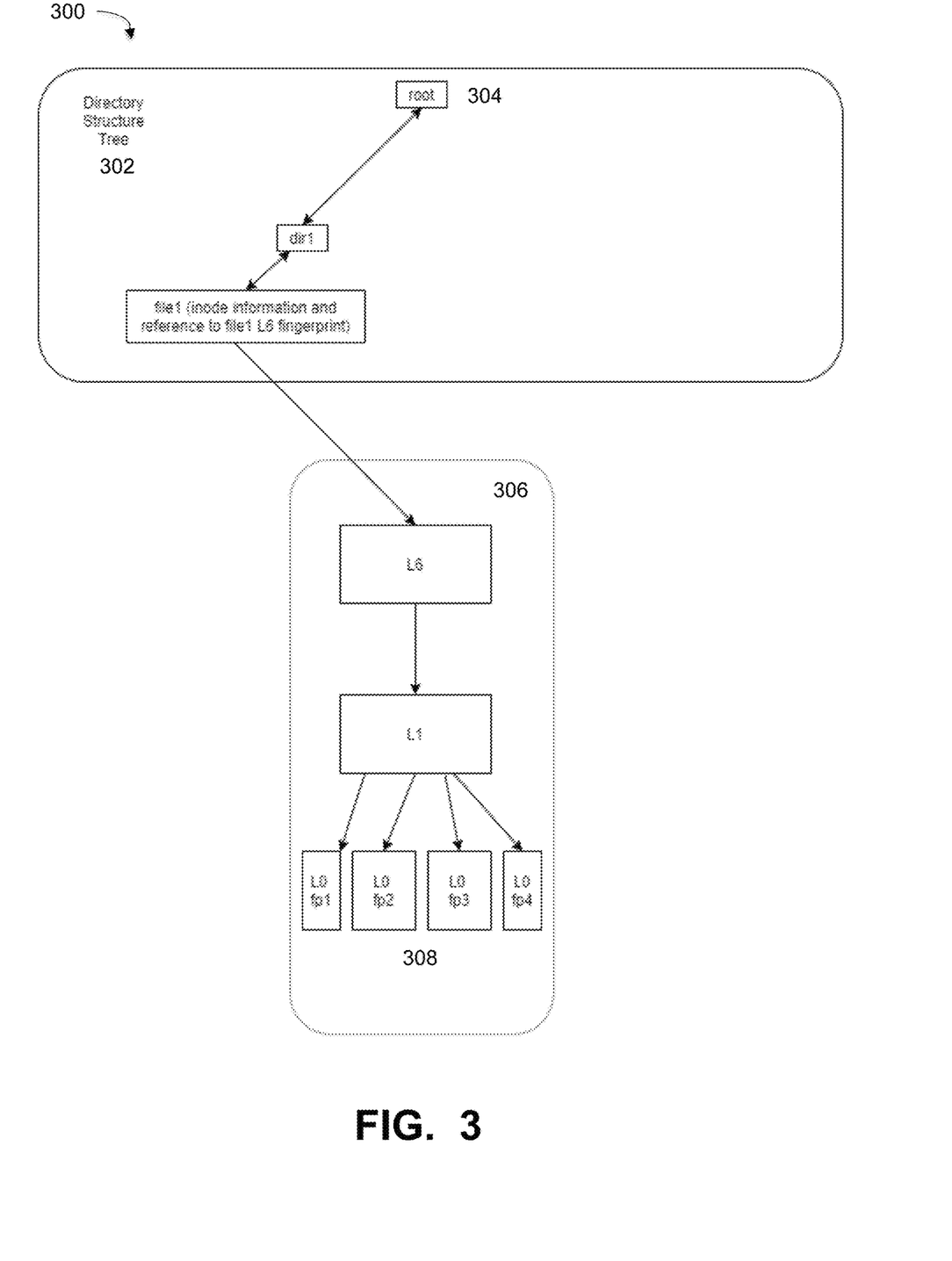
FIG. 3 illustrates a Data Domain filesystem Merkle tree accessed by a file under an example embodiment.

FIG. 3 illustrates a DDFS Merkle tree accessed by a file under an example embodiment. As shown in system 300, a directory structure tree 302 comprises a root directory 304, which accesses a directory (dir1) that holds a particular file (file1). The directory tree data for file1 comprises inode information and a reference to the file1 L6 fingerprint in the associated Merkle tree 306.

As mentioned above, the data chunks directly written to disk are referred to as $L_0$, meaning the lowest level of the tree, and which hold the respective fingerprints (fp1 to fpn). Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough to not need intermediate nodes. The $L_1$-$L_6$ chunks are referred to as Lp chunks, where p is a parameter that ranges from 1 to 6 and indicates metadata representing the file. Deduplication takes place because a chunk can be referenced multiple times. The filesystem is a forest of Merkle trees, but these trees are not disjoint, particularly at the lowest level.

Backup system 100 can implement various different backup operations, such as full backups that copy all the data from a source to a backup storage data, differential backups that backup all data that has changed from a last full backup, and incremental backups that backup only the data that has changed since a previous backup. In a virtualized environment using a hypervisor (e.g., VMware), these backups may be implemented using virtual storage and virtual full or virtual incremental backups. In addition, backups may be synthesized or implemented as synthetic backups, which involve generating a file from a complete copy of the file created in a full backup and one or more incremental copies created later.

Figure 4:
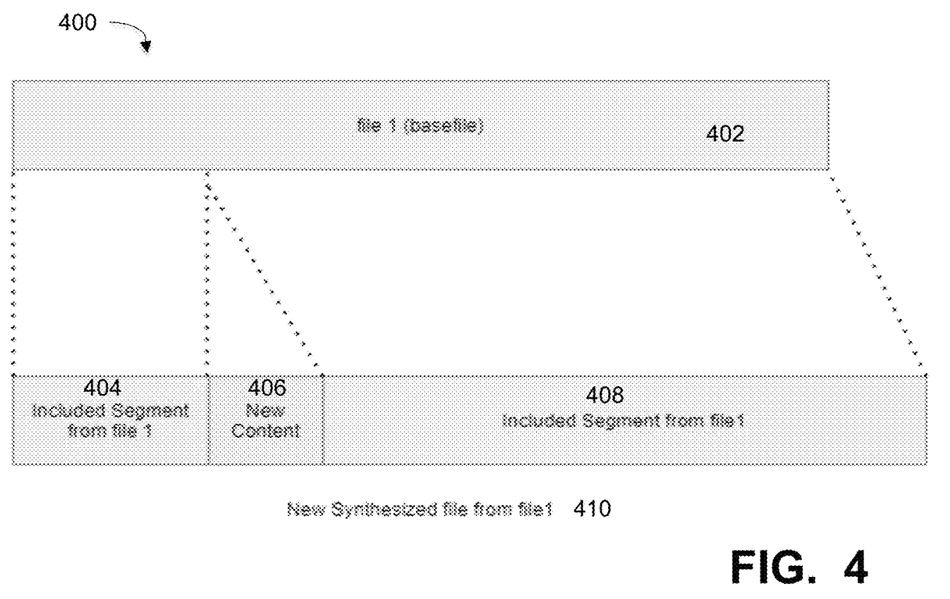
FIG. 4 illustrates the composition of a virtual synthetic backup file, under some embodiments.

A virtual synthetic process is a backup method where the incremental backup file is stitched on top the last full backup file so that the new backup file includes the portion of the incremental file and the last full backup. Traditionally, the last full backup file is called the base file, and the incremental file is called the increment. FIG. 4 illustrates the composition of a virtual synthetic backup file, under some embodiments. As shown in diagram 400 of FIG. 4, file 1 comprises a base file 402. The synthesized backup process works by incorporating (stitching in) new content 406 among or between other segments 404, 408 of the base file to generate the synthesized backup file 410.

Figure 5:
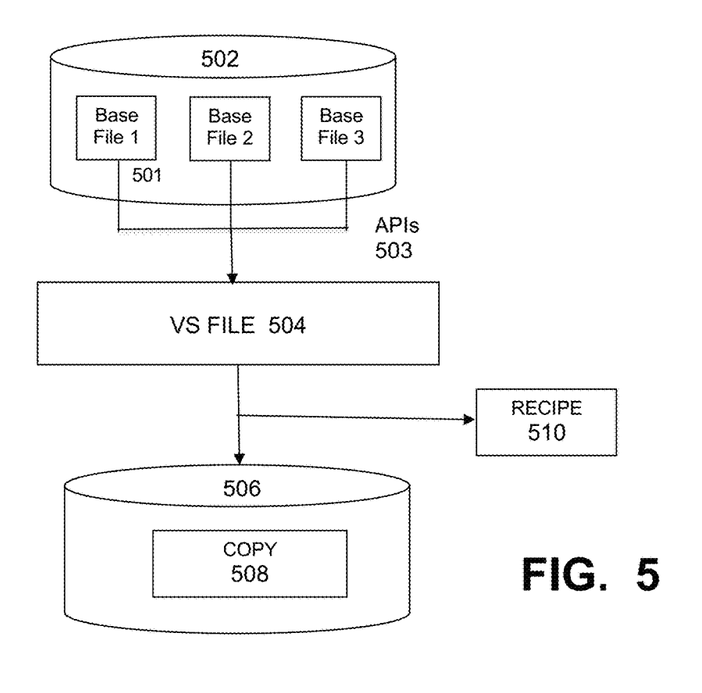
FIG. 5 illustrates generating a virtual synthetic backup file, under some embodiments.

FIG. 5 illustrates generating a virtual synthetic backup file, under some embodiments. As shown in FIG. 5, a source directory or disk 502 stores a number of base files that represent prior generations of a backup. The VS file 504 is created using special APIs (synthetic APIs) 503 to include portions of prior generations of the backup. When the VS file 504 is written to the storage disk 506 and stored as a copy 508, certain metadata is created as a file recipe 510. The recipe 510 comprises a description of the relationship of the target file or copy 508 to a set of prior generations of base files 501, and basically holds information about which portions of the given files are same. The recipe information was primarily developed to facilitate replication efficiencies, but is now used for differencing, and tiering features. Since the recipe is created using synthetic APIs, it is employed by products which integrate with the DDBoost library, such as Dell EMC Avamar and Dell EMC Networker products.

Another type of virtual synthetic workload is the Fastcopy Overwrite (FCOW) workload, which uses a copy of the last backup image, and then the segments which are changed are overwritten in place (on the copy). The FCOW is done on fixed sized segmentation environments where the segmentation would not have the IO amplification. The FCOW workload does not use the synthetic APIs, and therefore, recipes are not created for these copies. Embodiments of the fast copy overwrite file recipe process 120 provide a method to create the recipe for the FCOW workloads so that these workloads also get the benefits of the recipe information, as is the case for regular (non-fastcopy overwrite) VS workload copies.

As shown in FIG. 5, the Data Domain filesystem (and similar systems) supports virtual synthetic backups using special APIs 503 that can stitch the new file tree to copy portions (Lps) into a new Merkle tree of the VS file 504. Being a deduplication filesystem, this is optimally performed because all that is done is an operation that copies and manipulates metadata. Furthermore, as the filesystem creates the VS files from their base files, it stores the information about the VS files as metadata in the form of recipes 510. This information is used in replication, tiering and diffing, among other possible functions.

In general, a recipe by itself is information about a data extent from a certain file into the given file at the given offset in the current file. The extent is described by the offset in the source file, and the length of the extent. The destination offset is the offset when the source extent is "copied into". The virtual synthetic backup protocol is flexible in that it allows for includes from several base files instead of just one. Each of the base files referenced is kept in the base file table. The index of the base file in the base file table is used as the base file index in the recipe table.

An example recipe is shown in Table 1 below, which lists a base file index number with the file handle (as metadata).

TABLE 1

| Base file Index | File Handle/Metadata |
|---|---|
| 1 | File1 |

Additional metadata information comprises source and destination offsets and file sizes, as shown in Table 2 below.

TABLE 2

| Base file Index | Source Offset | Destination Offset | Size |
|---|---|---|---|
| 1 | 0 | 100000 | 100000 |
| 1 | 150000 | 10000000 | 9850000 |

Figure 6:
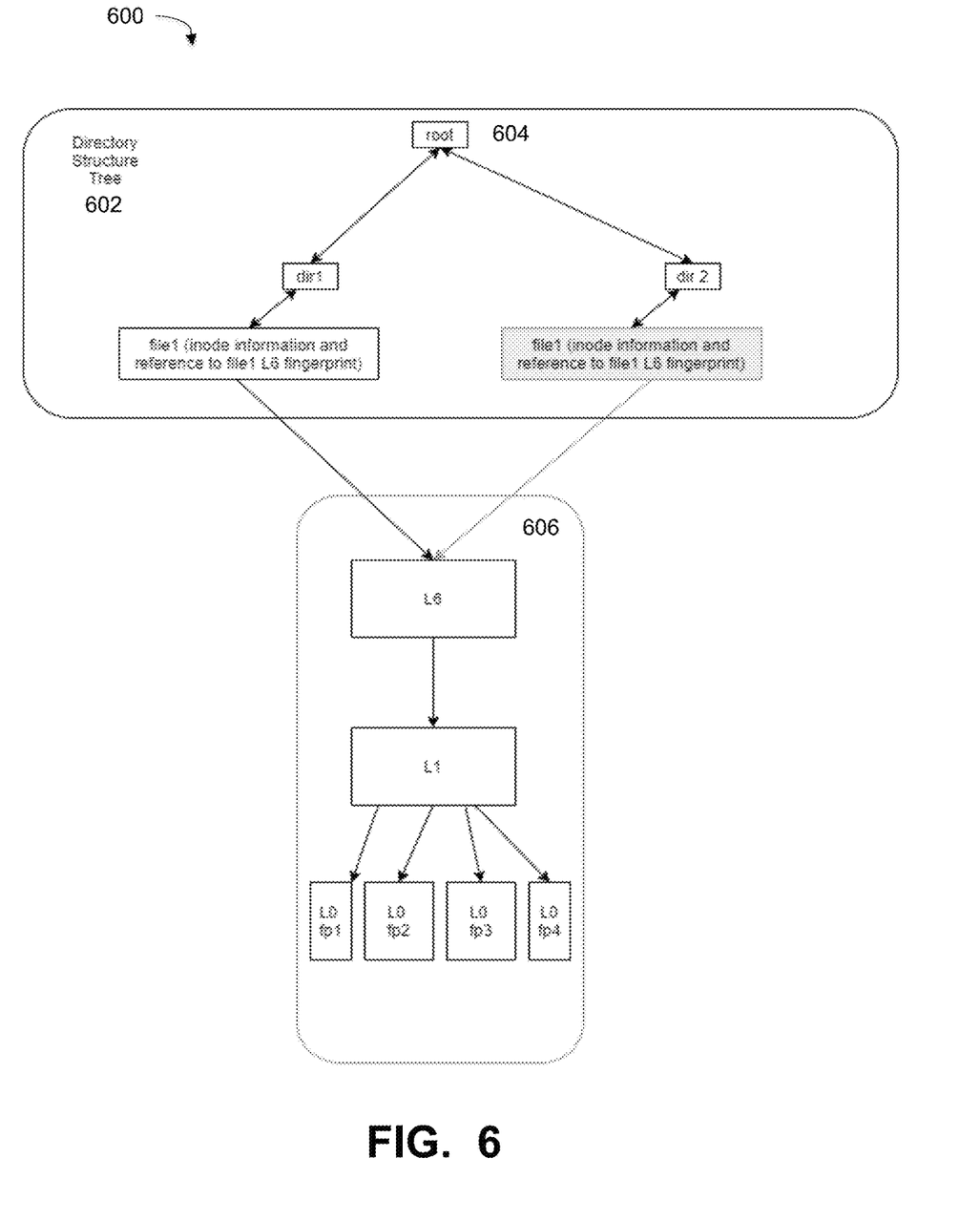
FIG. 6 is a diagram illustrating the fastcopy method of copying data, under some embodiments.

With respect to the fastcopy overwrite functionality, as described above with respect to the Merkle tree structure, the L6 segment is representative of the file and is placed in a B+ tree to form a namespace for the filesystem. The filesystem namespace is therefore a forest of the L6 segments. This provides an indirection that creates a very efficient way to create a copy of a file. If the L6 segment from an existing file were is copied into another element in the B+ tree, the file has been copied. Thus, by creating another node in the B+ tree and copying a few hundred bytes worth of metadata, a file, which could be hundreds of terabytes of data has been copied. FIG. 6 is a diagram 600 illustrating the fastcopy method of copying data, under some embodiments. As shown in FIG. 6, the directory structure tree 602 comprises a root directory 604, which accesses a directory (dir1) that holds a particular file (file1). The directory tree data for file1 comprises inode information and a reference to the file1 L6 fingerprint in the associated Merkle tree 606. Copying dir1 to another directory, dir2, only involves copying the file1 metadata comprising the inode information and reference to the file1 L6 fingerprint in the same tree 606. This is a trivially fast operation compared to copying the entire content data in the leaf nodes of tree 606.

Virtual synthetic backups are a method to create a file based on prior generations of the backup. This technique benefits from writing only the incremental backup, while not having to pay the penalty of the patching the incremental files while restoring the backup.

A second way of making virtual synthetic backups is by copying the last backup file and then overwriting the incremental segments. This is used with fixed sized segmented blocks, such as VM backups or block-based filesystem backups.

Figure 7:
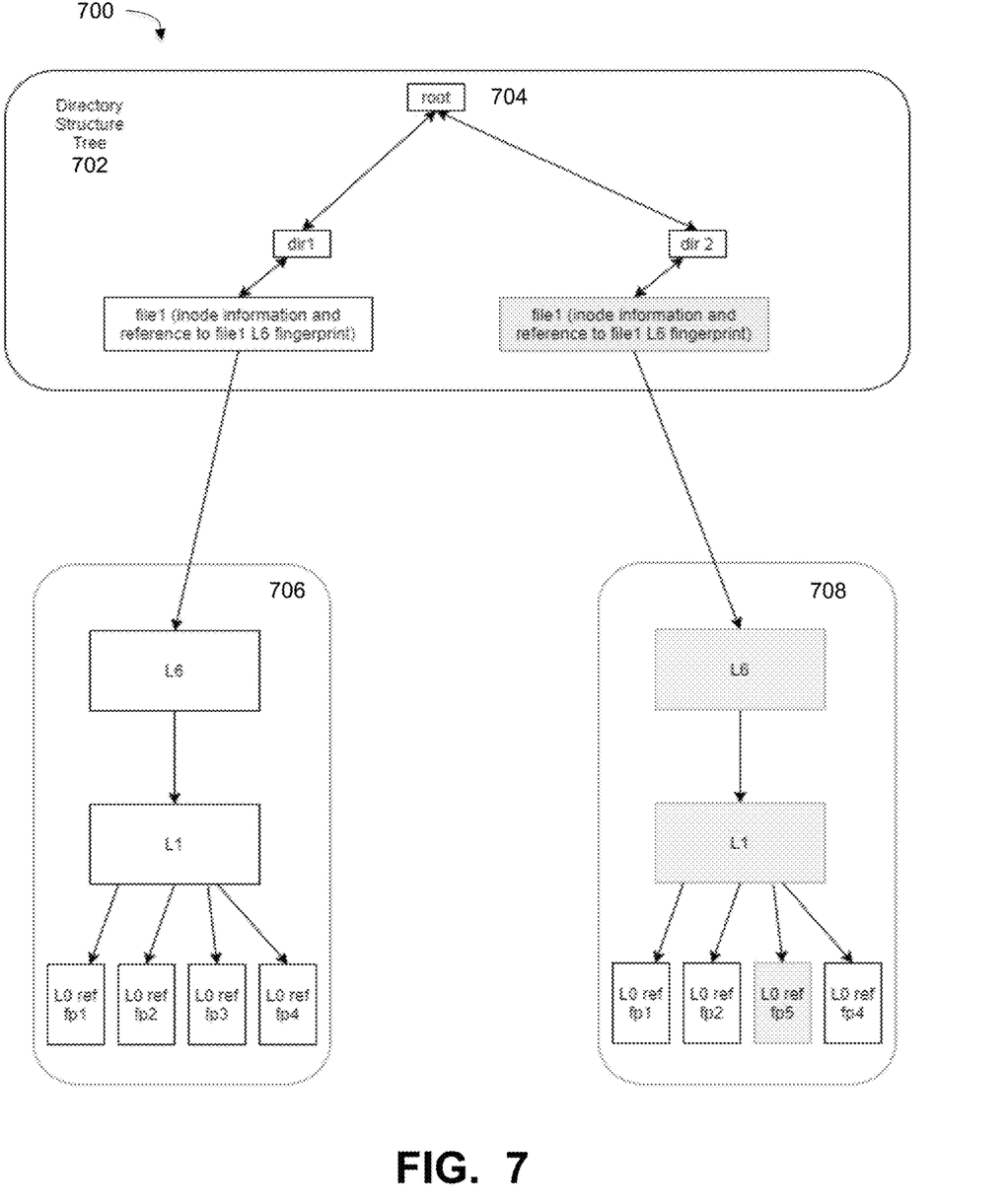
FIG. 7 illustrates an example of a fastcopy overwrite method, under some embodiments.

Since the Data Domain File System has a very efficient copying mechanism (fastcopy), this method has developed into a FCOW (fastcopy overwrite) method. The FCOW method basically calls for fastcopying the file (using the DDBoost APIs or REST APIs) and then overwriting the segments at the correct offsets over the network filesystem protocol. FIG. 7 is a diagram 700 illustrating an example of a fastcopy overwrite method, under some embodiments. As shown in FIG. 7, the directory structure tree 702 comprises a root directory 704, which accesses a directory (dir1) that holds a particular file (file1). The directory tree data for file1 comprises inode information and a reference to the file1 L6 fingerprint in the associated Merkle tree 706. As with the process 600 of FIG. 6, copying dir1 to another directory, dir2, only involves copying the file1 metadata comprising the inode information and reference to the file1 L6 fingerprint in the same tree 706. For the FCOW process, a second Merkle tree 708 is generated in which the new data blocks are inserted over any updated old data blocks. In the example of FIG. 7, fingerprint 3 (fp3) has been changed since the last previous backup, and so the L0 reference for fp5 overwrites the L0 reference for fp3 in tree 706 to produce new tree 708.

This FCOW method does not use any special APIs, and therefore does not store any synthetic information. Embodiments of system 100 include a system and method 120 whereby FCOW workloads are treated as virtual synthetic backups, but recipes are created and stored for these backups. This will enable the FCOW files to benefit from recipe optimizations, such as differencing, replication, and tiering. It should be noted that the fastcopy is a special kind of copy, however embodiments described herein may be employed with any type of filesystem.

In an embodiment, the process 120 performs two main sub-steps to enable the tracking of the source files and the relative overwrites to overcome the fact that the fastcopy overwrite workloads do not use synthetic APIs. The main steps are (1) detecting the FCOW workload, and (2) creating and storing the recipe information.

Figure 8:
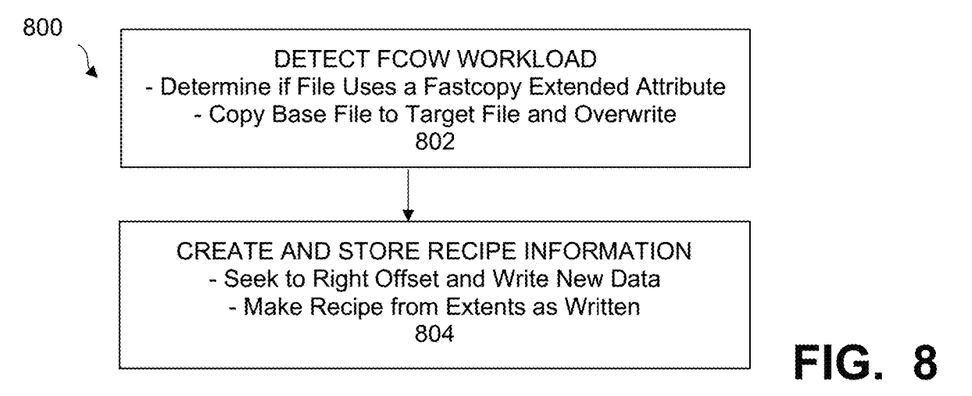
FIG. 8 is a flowchart that illustrates an overall method of creating file recipes for fastcopy overwrite workloads under some embodiments.

FIG. 8 is a flowchart 800 that illustrates an overall method of creating file recipes for fastcopy overwrite workloads under some embodiments. The first step of process 800 detects whether a backup operation involves or comprises an FCOW workload, 802. With respect to detecting the fastcopy overwrite (FCOW) workload, the process finds out if a given file which is being opened (for overwrites) was ever fastcopied, and if so, from what file. For certain filesystems, such as DDFS, this information may be present in the form of extended attributes. As the files are being fastcopied, the filesystem creates an extended attribute, which stores the file handle to the parent file (the source for the fastcopy command).

The Data Domain File System replication uses this attribute information to optimize the replication by using a special method called 'L0-differ'. Embodiments of process 120 use this extended attribute. In the embodiment, the file handle of the parent file will become the base file and the fastcopied file becomes the target file.

As the files are fastcopied, they essentially remember who the parent was, and this information is used when the files are replicated. Consider a base file b and a target file t, which was fastcopied from b and with some parts of t being overwritten. Now, file b got replicated to file b-repl. When it is file t's turn to get replicated, the attributes on t confirm that file b was the base file for t. The replication protocol also knows that file b has been replicated to b-repl. Therefore, the replication protocol can fastcopy the file b-repl to file t-repl and the overwrite the differences between file b and file t. The information that file t is fastcopied from b is kept as an extended attribute with file t. The extended attributes are extra metadata information that is stored with the file.

Once the base-file has been fastcopied (to the target file), the target file is opened in read-write mode, and portions of the file are overwritten, the process enters the step of creating and storing the recipe information, 804. This process involves seeking to the right offset and then writing the new data. Embodiments trap the seek offsets and write byte lengths. This will become the recipe for the target file. It will be tracking metadata for the extents being written, which is essentially the recipe. The extent, or a file extent is a contiguous portion of a file, and the recipe is a list of extents as they are included in a target file.

A specific example is provided to illustrate the FCOW workload recipe creation process, under some embodiments. For this example, consider the overwrites at the following offsets:

1. Seek to 104,857,600, and write 65936 bytes
2. Seek to 157,286,400 and write 204,800 bytes The process will put in the following in the recipe table:

TABLE 3

| Base File Index | File Handle/Metadata | | |
|---|---|---|---|
| 1 | Base file handle captured from the extended attribute | | |

| Base File Index | Source Offset | Destination Offset | Size |
|---|---|---|---|
| 1 | 0 | 0 | (104,857,600 − 0) |
| 1 | (104,857,600 + 65936) = 104,923,536 | (104,857,600 + 65936) = 104,923,536 | (157,286,400 − 104,923,536) = 52,362,864 |
| 1 | (52,362,864 + 204,800) | | |

The Table 3 above illustrates a file handle/metadata entry for a specific base file index (Base File Index 1) and corresponding offsets and file size for this base file index.

The process is tracking incremental write metadata, and complementing it to create the recipe information. The recipe describes the target file with respect to the base file. To continue the example case, consider the following operation:

3. Seek to 104,857,600, and write 65936 bytes

Here, the first overwrite was 64 kB and at offset 104,857,600. This means the target file is identical to the base file from offset 0 to offset 104,857,600. Therefore, in the recipe the process added the line 1, as shown in Table 4 below:

TABLE 4

| Base file Index | Source Offset | Destination Offset | Size |
|---|---|---|---|
| 1 | 0 | 0 | (104,857,600 − 0) |

To further continue the example case, consider the case where the next overwrite comes at offset 157,286,400, for 200 kB:

4. Seek to 157,286,400 and write 204,800 bytes

However, there was a write of 64 kB at 104,857,600 (the first overwrite). Therefore, the base file and target file are identical from (104,857,600+65,936) to 157,286,400, and the size of this extent is 157,286,400−(104,857,600+65,936).

The process will put in the following entry in the recipe table:

TABLE 5

| 1 | (104,857,600 + 65936) = 104,923,536 | (104,857,600 + 65936) = 104,923,536 | (157,286,400 − 104,923,536) = 52,362,864 |
|---|---|---|---|

The process remembers the extent size for the last write. This is illustrated by an incomplete line entry (as a start offset in the recipe). However, it just needs to be remembered, as it is enough to keep it in memory, and the recipe information is just for illustration.

The above example shows that the system 100 is able to create a recipe for a fastcopy overwrite use case without using any special synthetic APIs. The recipe information is used by replication, tiering and differencing in the following manner. For replication, consider a base file b, and its target file t, and also assume that base file b is replicated as b-repl. When the target file t is picked up for replication, the replication context looks at the recipe information and figures out the included segments. Thus, the target file on the replica (copied file) can be reconstructed by including extents from b-repl and the new segments which will be replicated. The tiering use case is very similar to the replication use case. Here, the process uses the recipe to diff any set of files which have the recipe relationship by inverting the recipe. Anything that is not in the recipe is not common.

In general, the fastcopy overwrite method is used with change block tracking (CBT) workloads. This is used with VM backups, disk image backups, or block-based filesystem backups, amongst others. In these scenarios, the source and destination offsets are the same.

There is an extended attribute set on the file calling this file out as a Fixed Sized Segmented (FSS) file. In an embodiment, the traps for the seek offsets and write offsets need only be done if the file stream is tagged FSS, and has been fastcopied.

Figure 9:
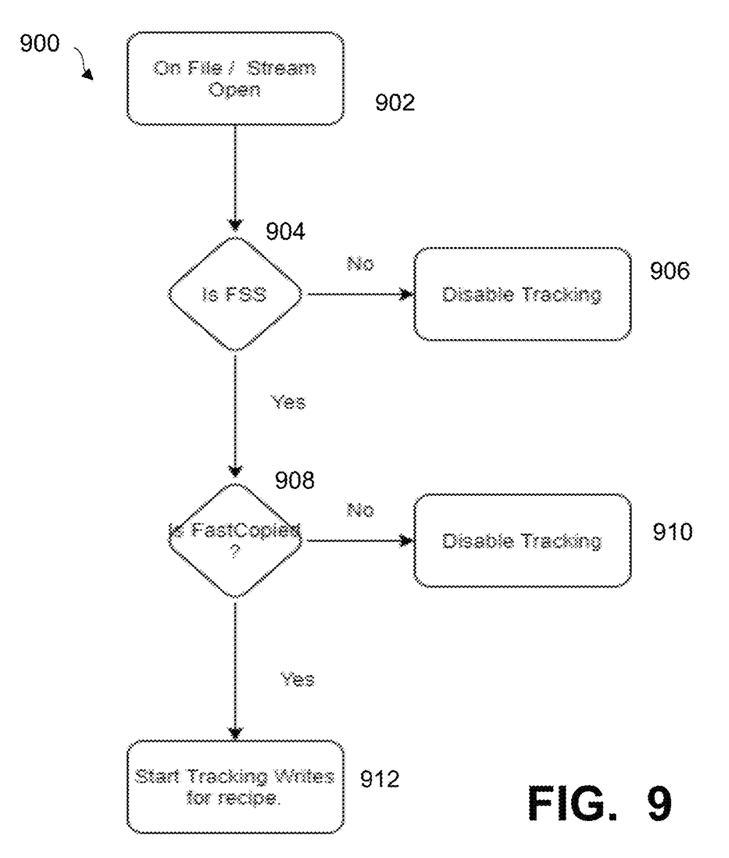
FIG. 9 is a flowchart that illustrates a method of tracking writes for a FSS file, under some embodiments.

FIG. 9 is a flowchart 900 that illustrates a method of tracking writes for a FSS file, under some embodiments. The process 900 starts upon a file or stream open operation 902. In step 904 it is determined whether or not the file is a Fixed Sized Segment (FSS) file. If not, the tracking function is disabled 906; otherwise, the process determined whether or not the file has been fastcopied, 908. If not the tracking function is disabled 910. If the file has been fastcopied the process starts tracking the writes to create the recipe, 912.

Figure 10:
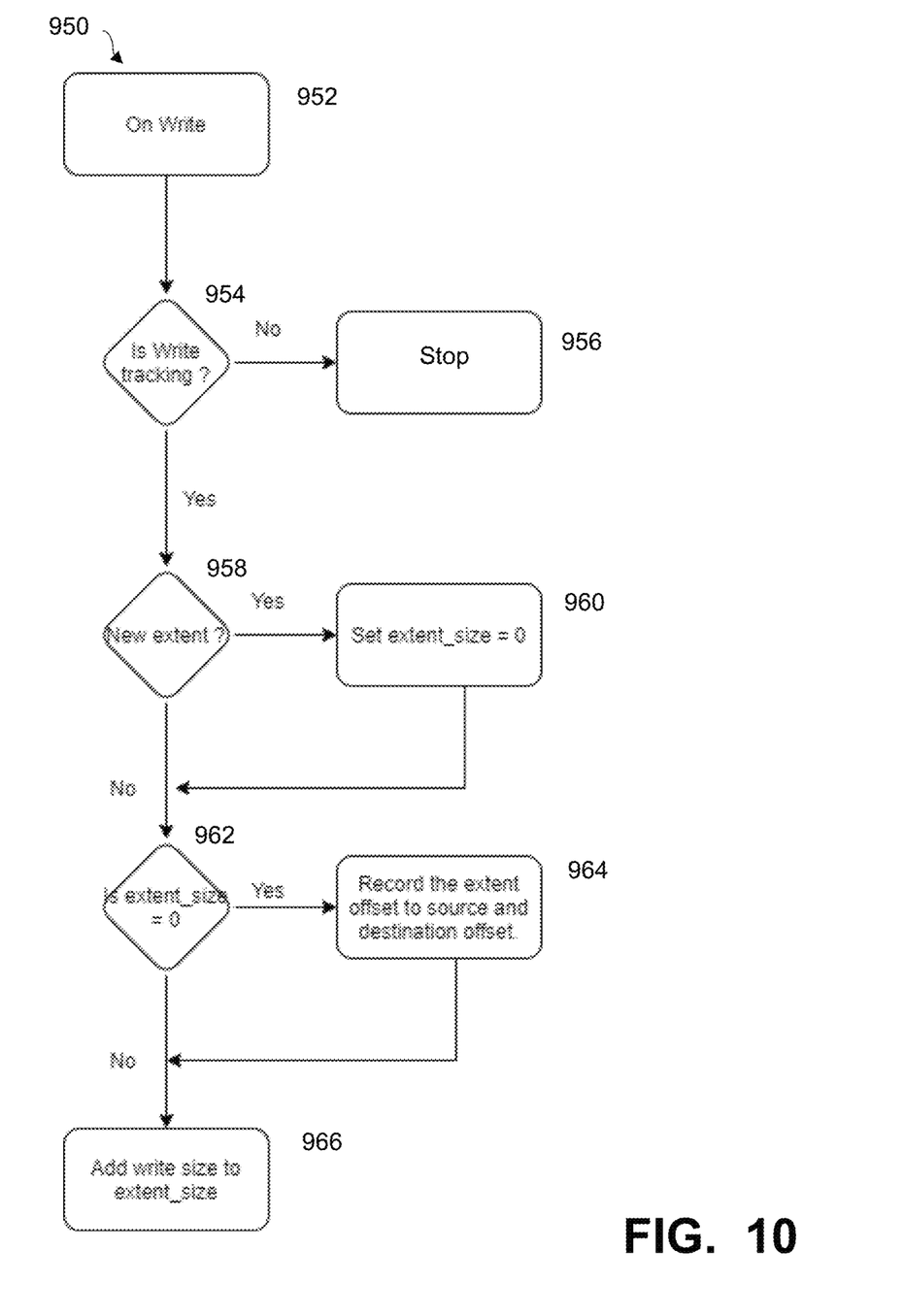
FIG. 10 is a flowchart that illustrates a method of creating a recipe using write tracking, under some embodiments.

FIG. 10 is a flowchart 950 that illustrates a method of creating a recipe using write tracking, under some embodiments. Process 950 starts on a write operation 952. If the data does not constitute an FSS file or lacks write tracking eligibility as determined in step 954, the process stops 956. If write tracking is appropriate and enabled, the process, on a seek, starts the tracking for the extent, 958. The seek offset becomes the source offset (and the destination offset) in the recipe, and the process resets the extent size written for the extent as 0, 960.

If the extent is not a new extent, the process determines if the write size is 0. If so, the extent offset is recorded to the source offset and destination offset, 964. After this step, or for every write that does not have a new extent or an extent size other than 0, the write size is added to the extent size, 966.

On the next seek (new extent), the process writes the extent information to the recipe table, that is, it computes the source offset, destination offset, size, and remembers the extent size for the next source offset. Upon the file close, the recipe is synced to the attribute Btree.

Figure 11:
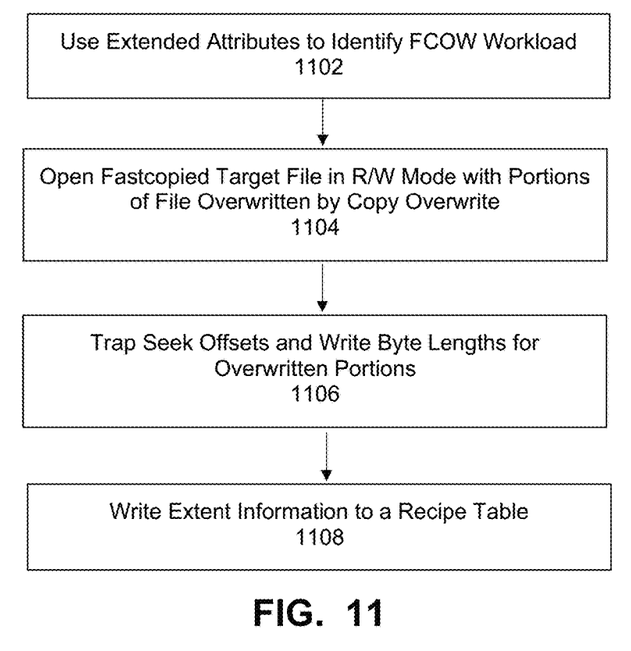
FIG. 11 is a flowchart illustrating an overall process of creating a file recipe for FCOW workloads, under an embodiment.

FIG. 11 is a flowchart illustrating an overall process of creating a file recipe for FCOW workloads, under an embodiment. As shown in FIG. 11, extended attributes, such as those indicating an FSS file are used to identify FCOW workloads that do not use synthetic APIs. Once the base file has been fastcopied to the target file, the target file is opened in read/write mode with portions of the file overwritten by the copy overwrites, 1104. The process then traps the seek offsets and write byte lengths for the overwritten portions, 1106. This write extent information is then written to a recipe table to become the file recipe, 1108.

The recipe thus created for the FCOW workload enables for faster replication (thus saving on compute and network cost), and tiering. There is no filtering involved for the common segments of file. Since the recipe is transferred to the copied file(s), it helps even in cascaded replication environments. The recipe makes the differencing of files much simpler and efficient, and that helps in use cases where difference-based restores are called for, or difference-based scan functions are used to check the consistency of the data.

Embodiments of the processes and techniques described above can be implemented on any appropriate backup system operating environment or filesystem, or network server system. Such embodiments may include other or alternative data structures or definitions as needed or appropriate.

Figure 12:
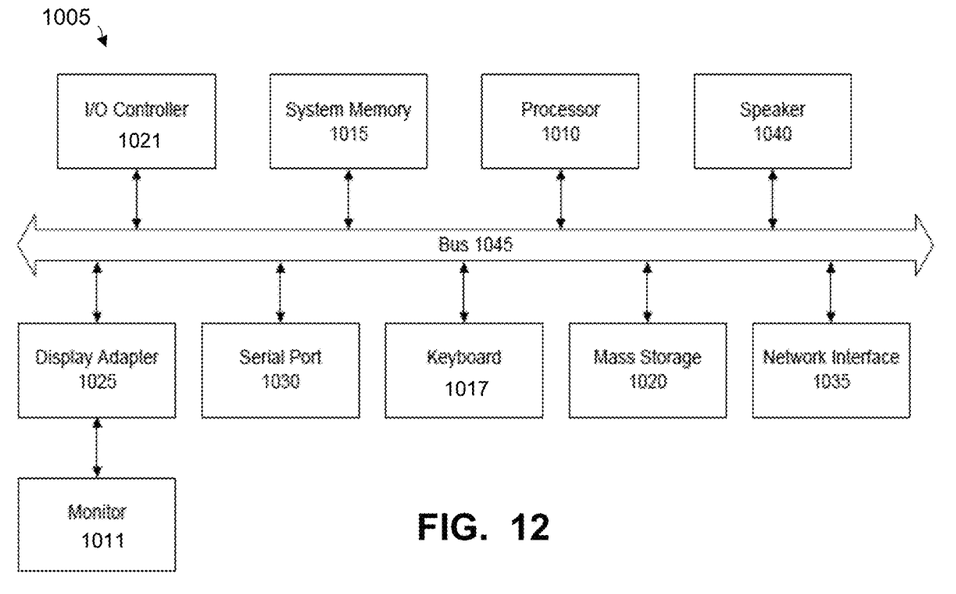
FIG. 12 is a block diagram of a computer system used to execute one or more software components of the methods and processing component described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 12 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated "with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of processing fastcopy overwrite backup workloads (FCOW) as virtual synthetic backups, comprising:
   detecting whether or not a backup workload comprises an FCOW workload in which a base file is fastcopied to a target file, wherein portions of the base file are overwritten through overwrites by new data in the target file by a deduplication backup process executed by a data storage server running a Data Domain File System (DDFS); and
   creating, for an FCOW workload file, a file recipe by trapping seek offsets and write byte lengths for the overwrites, and writing extent information comprising offset differences to a recipe table of the file recipe, wherein the file recipe facilitates file processing optimizations including differencing, replication, and tiering, wherein the base file and target file are each stored in a Merkle tree structure with content data stored in a bottom level of the tree and indexed by fingerprints, and further wherein the fastcopy process copies metadata of the base file comprising inode information and a reference to the file L6 fingerprint in a first Merkle tree to a second directory for the target file, and wherein a second Merkle tree is generated for the target file in which the new data blocks for the overwritten data are inserted over any updated old data blocks of the first Merkle tree.

2. The method of claim 1 wherein the FCOW workload comprises change block tracking (CBT) workloads, and wherein the detecting step comprises determining whether a specific extended attribute is associated with the base file.

3. The method of claim 2 wherein the extended attribute indicates that the file is a fixed size segment (FSS) file.

4. The method of claim 1 wherein the FCOW backups use one of Data Domain Boost application program interfaces (APIs) or REST APIs.

5. The method of claim 4 wherein the FCOW backup overwrites data segments at correct offsets over a network file system (NFS) protocol.

6. The method of claim 1 wherein the file recipe is equivalent to metadata that is created when a virtual synthetic file is creating using one or more synthetic application program interfaces (APIs).

7. The method of claim 6 wherein the file recipe represents a relationship between the target files and one or more prior generations of base files created by one or more previous full and incremental backup operations.

8. A computer-implemented method of creating file recipes for fastcopy overwrite backup workloads (FCOW) in a deduplication backup system, comprising:
   receiving a target file copied through a fastcopy overwrite operation on a base file that overwrites incremental segments deduplicated by the backup system, wherein the target file is a virtual synthetic backup file having fixed size segmented (FSS) blocks and comprising change block tracking (CBT) workloads, and wherein the base file copied as the target file has a specific extended attribute is associated therewith indicating a FSS file;
   opening the target file in read/write mode, wherein the overwritten segments are inserted at respective offsets;
   trapping seek offsets and write byte lengths for the overwritten segments; and
   writing extent information comprising offset differences to a file recipe that facilitates file processing optimizations including differencing, replication, and tiering, wherein the fastcopy process copies metadata of the base file comprising inode information and a reference to a file fingerprint in a first directory tree to a second directory for the target file, and wherein a second directory tree is generated for the target file in which the new data blocks for the overwritten data are inserted over any updated old data blocks of the first Merkle tree.

9. The method of claim 8 wherein the FCOW backups use one of Data Domain Boost application program interfaces (APIs) or REST APIs.

10. A computer program product, comprising a non-transitory computer-readable medium having a computer-readable program code embodied therein, the computer-readable program code adapted to be executed by one or more processors to implement a method of creating file recipes for fastcopy overwrite backup workloads (FCOW) in a deduplication backup system, comprising:
    receiving a target file copied through a fastcopy overwrite operation on a base file that overwrites incremental segments deduplicated by the backup system, wherein the target file is a virtual synthetic backup file having fixed size segmented (FSS) blocks and comprising change block tracking (CBT) workloads, and wherein the base file copied as the target file has a specific extended attribute is associated therewith indicating a FSS file;
    opening the target file in read/write mode, wherein the overwritten segments are inserted at respective offsets;
    trapping seek offsets and write byte lengths for the overwritten segments; and
    writing extent information comprising offset differences to a file recipe that facilitates file processing optimizations including differencing, replication, and tiering, wherein the fastcopy process copies metadata of the base file comprising inode information and a reference to a file fingerprint in a first directory tree to a second directory for the target file, and wherein a second directory tree is generated for the target file in which the new data blocks for the overwritten data are inserted over any updated old data blocks of the first Merkle tree.

11. The computer program product of claim 10 wherein the deduplication backup system is executed by a data storage server running a Data Domain File System (DDFS).

12. The computer program product of claim 11 wherein the FCOW backups use one of Data Domain Boost application program interfaces (APIs) or REST APIs.

* * * * *